Aug. 23, 1966

H. E. GOLDBERG 3,267,795

TEMPERATURE COMPENSATED REFRACTOMETERS

Filed Feb. 20, 1961

INVENTOR.
HERBERT E. GOLDBERG
BY Hane and Nydick
ATTORNEYS

Aug. 23, 1966   H. E. GOLDBERG   3,267,795
TEMPERATURE COMPENSATED REFRACTOMETERS
Filed Feb. 20, 1961   2 Sheets-Sheet 2
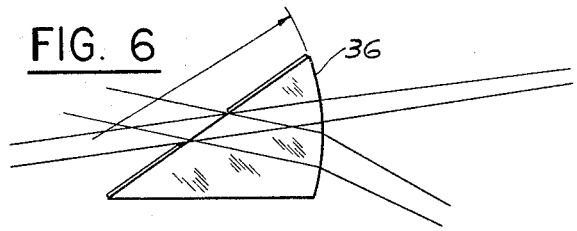
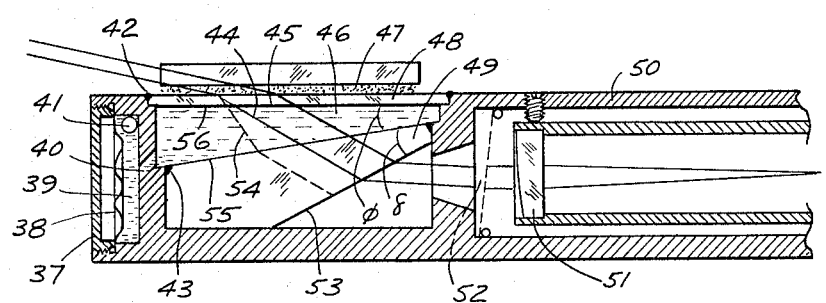
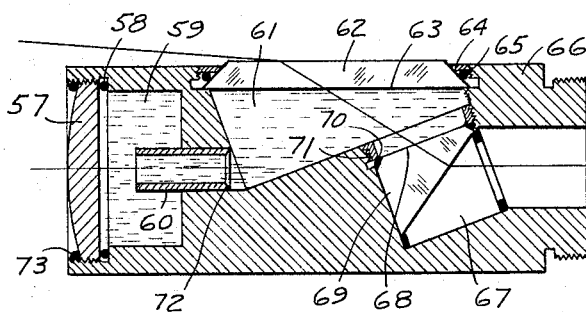
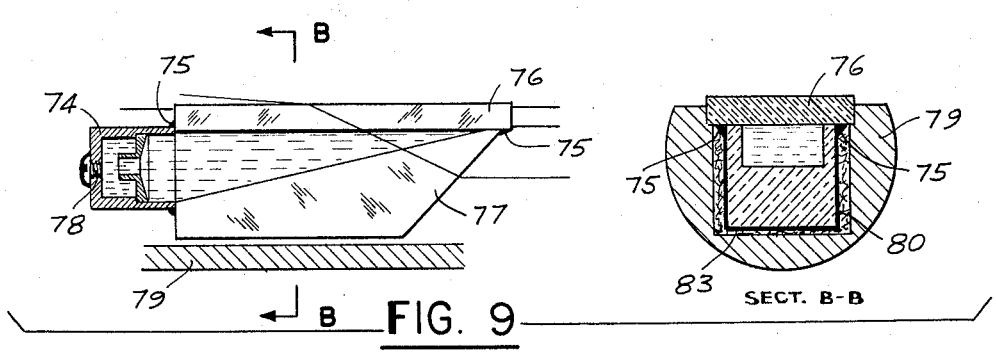
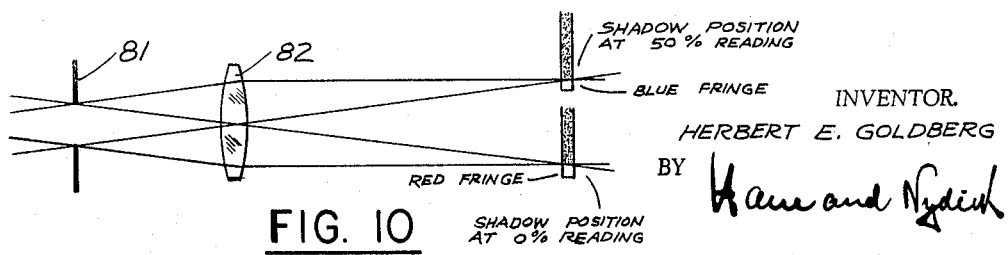
INVENTOR.
HERBERT E. GOLDBERG
BY
ATTORNEYS

United States Patent Office 3,267,795
Patented August 23, 1966

3,267,795
TEMPERATURE COMPENSATED
REFRACTOMETERS
Herbert E. Goldberg, Keene, N.H., assignor to American Optical Company, Southbridge, Mass., a voluntary association of Massachusetts
Filed Feb. 20, 1961, Ser. No. 90,499
12 Claims. (Cl. 88—14)

This invention relates to refractometers and similar measuring instruments, particularly the type which is used in laboratory work, and in the chemical and process industries for the purpose of measuring or controlling the composition or concentration of liquid substances or solutions.

Such instruments are often based on the measurement of the so-called critical angle of total reflection, in which the position of a boundry line dividing a field of view into a bright and a dark portion is observed against a fixed scale or mark. In other cases, particularly in continously reading instruments, the spectrometer type of refractometer is used. Although the invention will be described mainly as it is used in the total reflection type of instrument, it is understood that it can be used in connection with either type.

Although the physical quantity measured by refractometers is the refractive index of the substance under test, it is often convenient to calibrate the scales or controls of the instrument in units which are or more immediate practical value to the user such as for instance percent sugar, specific weight, iodine number, the calibration being based on standard tables showing the relationship between standard refractive index and the quantity desired.

Because the thermal expansion of all liquids is substantial, their actual index of refraction and thus the result of the measurement, changes with temperature, and such scale calibrations are thus valid only over narrow ranges of temperature. For instance, it has been found that a refractometer scale which has been calibrated to read a 10% sugar solution correctly at 68° F., will read the same solution at 9.5% if the temperature rises at 78° F. Since a change of concentration of as little as 1/10% is often economically significant in the process industries, it is obvious that the temperature of the sample used for the measurement must be known within a degree F. or so, and that corrections must be applied to the refractometer reading whenever the temperature deviates from normal by that amount.

So called differential refractometers have been designed where the index of the product under test is compared to that of a standard sample of the same or a similar material, both being held at the same temperature. The error is eliminated by this procedure, but the use of the instrument is restricted to a narrow range of products.

It has also been proposed to correct the temperature error of a refractometer reading mechanically, for instance, by moving the refractometer scale either manually or by some temperature responsive element.

Manual adjustment would require an exact knowledge of the temperature of the sample to be measured, and would be subject to errors in the reading of this temperature and in the setting of the compensation adjustment. On the other hand, if compensation were to be carried out automatically, it would be essential to maintain accurate temperature equilibrium between the sample to be measured and the temperature responsive element inside the instrument. It turns out furthermore that the scale movement required for a certain temperature change is not the same at all points of the scale. Thus it can be seen that, except for specialized instruments covering very limited ranges of refractive index, complex mechanisms must be relied upon to produce different displacement at the various positions of the scale. These have proved unreliable in practical use and have not been accepted by the industry.

It is thus an object of the present invention to provide simple and reliable means to render the readings of a refractometer substantially independent of temperature over all ranges of temperature and refractive index normally encountered in laboratory or industrial use.

It is also an object of the invention to provide this temperature compensation without mechanically moving parts.

It is another object of the invention to provide structures and arrangements of parts which will assure satisfactory performance of the device under severe operating conditions and without need for maintenance or adjustment.

Other objects of the invention, the principle of the device, and several detailed examples of it, have been described in the following specification and drawings, in which FIGURE 1 is a schematic cross section view of the optical system of a hand refractometer.

FIGURES 2a, b and 3a, b are alternate forms of prism assemblies producing temperature compensation which may be inserted into the light path shown in FIGURE 1.

FIGURE 6 shows another embodiment of the invention providing for a modified refractometer scale, and simplifying temperature compensation over an extended range of refractive index.

FIGURE 7 shows an optical system of temperature compensation making use of a liquid filled compensating prism.

FIGURE 8 shows another design of a liquid filled refractometer head.

FIGURE 9 shows a sealed, liquid filled, compensating prism.

FIGURE 10 shows the effect of lateral color aberration in a refractometer.

Figure 1:
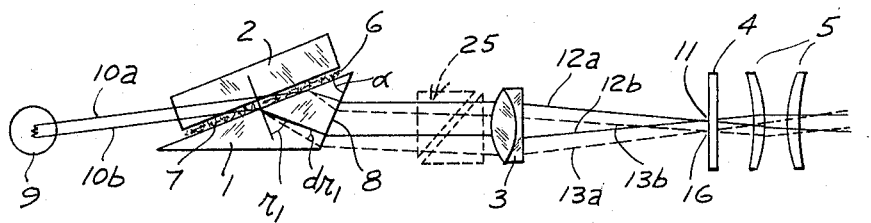

A hand refractometer of the critical angle type is shown in FIGURE 1. The optical system of the instrument is composed principally of a main refractometer prism 1, a cover 2, an objective lens 3, a scale 4 and an eye piece 5. A casing and various mounts, spacers, and retainers are used to position the optical elements so as to assure proper alignment, calibration, and operation, but since they are similar to those presently used in commercial instruments, they have not been shown in the drawing. A layer of a substance 6 whose index is to be measured is spread onto the surface 7 of prism 1 and covered with a light transmitting cover 2. It is illuminated by a light source 9 which may or may not be part of the refractometer proper.

Collimated bundles of light rays 10a, 10b pass through the cover 2 and the substance 6. After having been refracted at the interface 7, and at the color correcting face 8, they are focused by objective lens 3 onto the scale 4, whose position is observed through the eyepiece 5.

The rays 12a, 12b illustrate the path traveled by one such bundle at a temperature $t$. If the temperature is now assumed to increase by $dt$, the index of refraction $n_s$ of the substance 6 will decrease by $dn_s$, about .0001 to .0002 per degree C., depending on the particular substance. The index $n_g$ of the main glass prism 1, however, remains practically constant because the thermal coefficient of index for glass is only $10^{-5}$, per degree C., some ten or twenty times smaller than $dn_s$. It is seen, therefore, that at the higher temperature the difference of refractive index between sample and glass has increased and that the angle of refraction $r_1$ (FIGURE 1) must decrease by $dr_1$. The position of the refracted beam will thus shift from 12a, 12b, to 13a, 13b, and the refractometer reading on the scale 4 will change from 11 to 16. The change of angle $dr_1$ is:

$$dr_1 = dn_s / n_g \cos r_1 \qquad (1)$$

It is inversely proportional to $\cos r_1$, which of course depends on the index of refraction $n_s$ of the sample itself. This is one reason why the temperature error in a refractometer is not the same at all points of the scale.

Figure 2A:
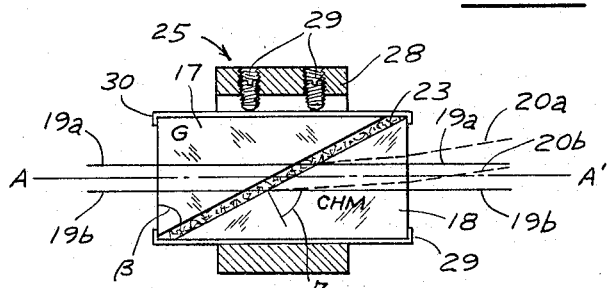
Figure 2B:
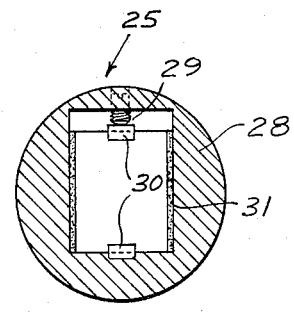

FIGURES 2a and 2b shows a temperature compensator designed to neutralize the effect just described. It is composed of the glass prism 17, and a second prism 18 cut of a material whose index of refraction $n_p$ varies substantially with temperature. Cyclohexylmethacrylate (CHM) is a suitable substance. Its temperature coefficient is approximately $dn_p / dt = -.00015 /$ degree C.

If the glass prism is chosen such that its index of refraction is equal to that of CHM at 20° C. for instance, a bundle of light rays 19a, 19b, will pass through the compensator without deviation at that temperature, the angle of refraction at interface 23 being $r_2$. At higher temperatures, the bundle will be refracted at the interface 23 into a direction 20a, 20b corresponding to an increased angle of refraction $r_2$. The change is given by $$dr_2 = -\tan r_2 \, dn_p / n_p \qquad (2)$$

Figure 3A:
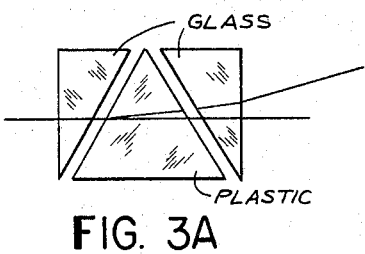
Figure 3B:
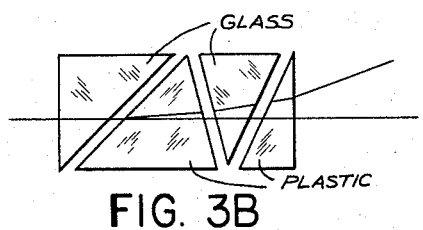

It is seen that $dr_2$ is negative for an increase of $n_p$, ($dn_p$ being positive), whereas it was shown above that $dr_1$, was positive for an increase of $n_s$. It is thus possible to compensate the displacement of the boundary line in the refractometer shown in FIGURE 1, by inserting the compensator shown in FIGURE 2a between prism 1 and objective lens 3 as shown in FIGURE 1, dotted outline, or between the objective lens 3 and the scale 4. Equation 2 shows that the compensating effect depends on the temperature coefficient of refractive index of the material used $dn_p / n_p$, and on the angle of refraction $r_2$ which depends on the nature of the main prism, the angle of the compensator prism, as well as on the index of the material to be measured. It is thus possible to compensate the refractometer perfectly at two points of the scale or at two different temperatures. The choice of $dn_p / n_p$ is limited however, and if it is necessary to compensate over large ranges, several compensators must be placed in series as shown in FIGURES 3a and 3b.

These compensators consist of a set of prisms in which glass and plastic components follow each other. They function as explained above, but the angles of the various prisms are calculated to provide the best possible temperature compensation at any number of points of the scale.

Figure 4A:
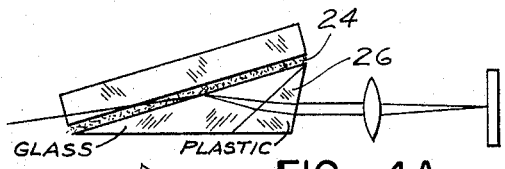
FIGURES 4a, 4b are schematic cross sectional views of temperature compensated main refractometer prisms.
Figure 4B:
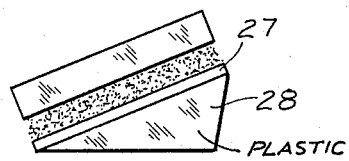

In the examples described so far, it has been assumed that the index of refraction and the color dispersion of all materials used for the compensator components are identical at one temperature. It also has been assumed that the entrance and exit faces of the compensator assembly are substantially normal to the light path. In this case the compensator would have little, if any, effect on the path of the light rays 12a, 12b shown in FIGURE 1. It will provide compensation, but it will not alter the performance of the instrument, assuming that the well known effects produced by the presence of a flat piece of glass in the light path have been allowed for. Should the index of refraction and/or color dispersion of the two materials used in the compensator differ at all temperatures, there would be a noticeable deviation of the light bundles at all temperatures and colored fringes could appear at the boundary line of the refractometer shadow. These effects may be corrected by altering the index or the color dispersion of the main prism 1, or by adjusting the orientation of its color correcting exit face 8. It is also possible, and in fact it is advantageous in practice, to combine the functions of the main refractometer prism and the compensator. This is shown in FIGURE 4a. This design reduces the number of components, shortens the spacing between sample substance 24 and temperature compensator 26, and assures a better temperature equilibrium and shorter response time to temperature changes. An extreme form of this design is shown in FIGURE 4b where the glass prism has been reduced to a thin wedge or plate 27, protecting the all-plastic refractometer prism 28 from being scratched or chemically attacked. If abrasion resistance or chemical inertness are not important, the glass may of course be omitted all together.

It has been noted that the action of the compensator depends on the angle of refraction $r_2$, FIGURE 2a, and that perfect compensation can be accomplished at several points of the refractometer scale. According to Equation 2, the effect is zero for $r=0$, and becomes infinite for $r=90°$. The prism angle $\beta$ of the compensator shown in FIGURE 2a should therefore be chosen such as to obtain the proper ratio of the angles of refraction $r_2$ for two points of the scale. Practical angles are of the order of 60 degrees, and it often becomes necessary to cement the components 17 and 18 in order to prevent total reflection of the light beam at the exit face of prism 17. This presents a problem of cracking and separation, because the temperature compensation depends on a large difference of thermal expansion coefficients between the two components 17 and 18. It has been found important in practice to avoid the modern polymerizing lens cements, and to use a non-hardening compound of a viscosity of less than $10^6$ poises or simply a layer of grease. FIGURES 2a and 2b show a suitable mounting for a grease contacted assembly. A ring 28 and screws 29 maintain contact between the components 17 and 18 whereas U-strips 30 prevents them from sliding in a horizontal direction. The space 31 between the mount 28 and the optical components may be filled with a low melting, heat conducting, material such as Wood's metal in order to improve the temperature equilibrium between the compensator and the casing of the instrument.

A more viscous cement can of course be used if the spacing between prism 17 and 18 is increased sufficiently to keep the shear strain low enough to prevent separation. A cement can be avoided all together, in principle at least, by polishing the components 17 and 18 to nearly perfect flatness and spacing them by less then one wavelength of light.

It is interesting to note that only the component of refraction in the plane of the paper produces temperature compensation. If the compensator were rotated about axis A–A' by an angle $x$, the compensating effect would decrease with $\cos x$. Since some transverse refraction is not harmful in refractometers, rotation of the compensator assembly may be used for precise adjustment of the effect, increasing the allowable tolerances on index or angle of the compensator components.

Figure 5:
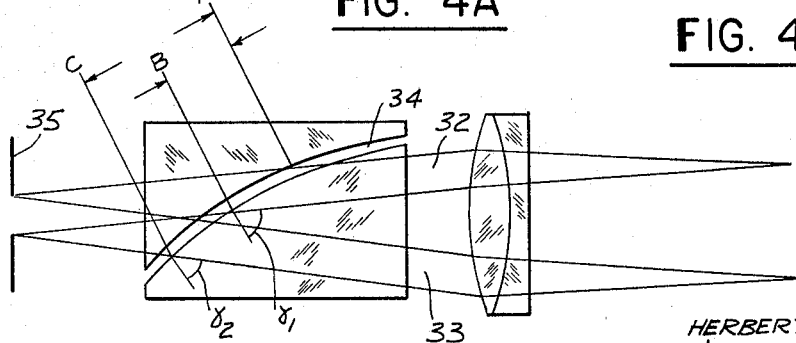
FIGURE 5 is a schematic cross sectional view showing a temperature compensating prism shaped to provide accurate correction over a large range of refractive index.

It has been pointed out already that in principle any ratio of compensation at the two ends of the scale is possible, no matter how large. A practical limit is set by the size of the compensator which may become excessively long as angle $\beta$, FIGURE 2a, is increased. Large ratios of $r_2$ can be achieved in a more practical way by giving the interface 23 a cylindrical, spherical, or otherwise curved form. This is illustrated in FIGURE 5 where light bundles 32 and 33 pass through the cylindrical interfaces 34 at angles $\gamma_1$ and $\gamma_2$ whose ratio is very much larger than could be obtained with a plano interface. As aspheric interface actually would allow perfect temperature compensation to be obtained over the entire refractometer range.

The defocusing effect of the astigmatism introduced by such a curved interface is small because of the small difference of refractive index involved. It can be reduced further by placing the compensator at a substantial distance from the aperture stop 35 of the instrument so that the length of the area AB, FIGURE 5, intersected by any one light bundle, would be less than half of the total useful length AC of the interface.

The accuracy of the compensation over the refractometer range may also be improved by modifying the refractometer scale so as to more nearly equalize the required displacement of the light beams for all points of the scale. This would reduce the length of the compensator, or it would make it possible to employ other types of compensators that provide for an equal relative displacement between all light bundles and the refractometer scale. Non-linear expansion and/or compression of the scale can be achieved by introducing refraction into the light path or by curving one of the faces of the main refractometer prism as illustrated in FIGURE 6 (face 36).

All temperature compensators discussed so far employ the thermo-optical properties of so-called plastic materials, that is, solid organic compounds. Actually any other material may be used as long as it has a temperature coefficient of refractive index $dn/dt$ sufficiently large to produce the desired effect.

A practical lower limit would be of the order of $dn/dt = .00005$ refractive index units/degree C., because anything below that would call for a very large compensator prism angle or result in an excessive number of refracting surfaces. This consideration would exclude presently known vitreous materials, but on the other hand it focuses attention on liquid or semi solid compounds with viscosities lower than 10,000 poises. The coefficients for liquid materials are particularly large and range all the way from $dn/dt = .0001$ for water, to $dn/dt = .0004$ for many oils, and even beyond.

Use of such materials results in small but effective prism angles of the compensator prism and also in very compact instrument construction. A typical design is shown in FIGURE 7.

Two glass prism or plates 48 and 49 are held in a casing 50 by continuous cement beads 42 and 43. The space 46 between the prisms 48 and 49 is connected through a passage 40 with an expansion chamber 39 and is filled with a liquid of suitable characteristics. The expansion chamber 39 is closed off by gasket 38, made of a suitable flexible material such as synthetic rubber, and sealed by the cap 37 after filling.

Light rays enter the instrument through the material to be measured 47 and are focused onto a scale not shown in the drawing by the objective lens 51 after passing through the liquid filled chamber 46 and the color correcting prism 49. A rise in sample temperature will deflect the refracted rays 44 clockwise into a direction 54 because the index of the material 47 has decreased. However, a corresponding decrease of the index of the prism formed by the liquid filled cavity 46 produces a compensating deflection of the light rays towards the apex of the prism and thus restores the original direction of the light rays in the prism 49 and beyond. There remains a displacement of the light beam, but this has no effect on the image position on the scale, since we deal with bundles of collimated light where the position of an image depends on direction only. If the geometry of the prism assembly just described is annlyzed, it is found that in the case where plate 48 is plane parallel, temperature compensation is obtained if the angle of the liquid is:

$$\tan \phi = \frac{\cos r}{\dfrac{dn_L/dt}{dn_s/dt} - \dfrac{n_s}{n_L}}$$

where $n_s$ is the index of refraction of the material 47 and $n_L$ is the index of refraction of the liquid.

The liquid must be chosen carefully, of course. It should show a high thermal coefficient of refractive index, the index itself must be suitable, the vapor pressure should be low at the temperatures likely to be encountered by all possible users. The freezing point must be low, there should be no tendency to foam, or to decompose even under continuous exposure to light, and it should be compatible with the sealing cement used. Toluene has proved to be acceptable on these counts. Its temperature coefficient of refractive index is very large, .00055, which produces satisfactory compensation over the usual sugar scale with reasonable liquid prism angles of the order of 5 to 10 degrees. Its refractive index is sufficiently close to that of some optical glasses to prevent internal reflection entirely, and to render polishing of prism surfaces 55 and 56 unnecessary. Its $v$-value is 31, somewhat low, but it can be accommodated as shown in a later paragraph. It boils high and freezes very low. It can be sealed by the conventional litharge glycerine cement which has been used in many conventional refractometers, or by the more modern solvent resistant resins.

Precautions must be taken to accommodate the thermal expansion of the compensating liquid. In the design of FIGURE 7, a flexible diaphragm 38 will allow the liquid to expand without build-up of undue pressure and the constriction 40 will tend to keep a possible air bubble 41 contained in chamber 39, and away from the optical path.

The necessary temperature equilibrium between substance 47 and the liquid in cavity 46 is maintained principally by conduction through plate 48, and in case of a dipping refractometer by conduction through the walls of the casing, a very satisfactory construction.

A more advanced design is shown in FIGURE 8. The top prism 62 is sealed to the casing 66 by an O-ring 65, and retainer 64. The color-correcting prism 69 is forced against a wedge shaped ring 67 through O-ring seal 70 and retainer 71. The liquid prism is formed by the faces 63 and 68 of prisms 62 and 69 and is connected to the expansion chamber 59 through a protruding tube 60. In practice the assembly is completely filled with a liquid such as toluene at a temperature higher than any expected in practical use, for instance 230° F., and sealed by gasket 58, plug 57, and if necessary, cement layer 73.

The liquid will contract upon cooling and a vapor bubble will form within the cavity. The instrument is then tipped so as to cause this vapor bubble to pass through tube 60 into the expanscion chamber 59. Because of the protruding tube the bubble will never return into the optical chamber except under conditions of violent vibration. In the rare cases where this does happen, the bubble will pass back into the expansion chamber as soon as the instrument has been placed into a vertical position, expansion chamber up. A funnel 72 and a minimum bore diameter of ⅛ inch in the connecting tube 60 facilitate the passage. This arrangement prevents positive pressure from developing in the liquid and minimizes distortion of prisms 62 and 69 and strain on the cement which otherwise might develop in the cemented assemblies described below. The principle of operation would not change if an air bubble were to develop in the cavity due to incomplete filling or to insufficient degassing of the liquid.

A hermetically sealed assembly is shown in FIGURE 9. It consists of prisms 76 and 77 and bubble trap assembly 78. The liquid prism is formed by a channel ground into one of the prisms 76 or 77, and the assembly is held together with cement beads 75 and filled through the hole 78 as already described.

As shown in the section B–B there is no direct contact between the metal casing 79 of the refractometer and the compensating liquid. Heat transfer from sample to liquid takes place mainly through the prism plate 76. Tests show that for a cover plate thickness of ⅛" and under the most unfavorable conditions, where the instrument is cold and used as a dipping refractometer to check a warm liquid, several minutes are required to produce sufficient temperature equilibrium for an accurate measurement. Plates 76 thicker than ¼″ are thus impractical for dipping applications. On the other hand requirements on the regularity of the top surface of plate 76 are severe and make it difficult to employ plates thinner than ⅟₁₆″.

The heat transfer to the compensating liquid can be improved by filling some or all of the space between the bubble trap assembly 74 and/or prisms 76, 77, and the casing 79 with a heat conducting material 80, or by electroplating or otherwise depositing a heat conducting coating onto those faces of the prisms which are in contact with the instrument casing. Heat equilibrium can be further improved by covering those surfaces of the assembly which are not needed to transmit light with a heat conducting layer 83.

All examples shown so far have made use of the thermal coefficient of the index of refraction of prisms to produce compensating deflection of light beams, but it must be understood that analogous effects can be obtained by other optical elements, such as for instance, decentered lenses or Mangin type mirrors relying on thermal expansion to produce a change of optical reflection.

Many considerations determine the choice of the glasses used in the assemblies discussed. As in all refractometers, the glass in contact with the substance to be measured must be stable, abrasion resistant, and of sufficiently high index. For the best possible color compensation, the $v$-values of all glasses used must be within narrow limits, depending on the geometry of the system. In temperature compensated instruments, particularly in systems using liquid prisms, additional difficulties are introduced by the low $v$-value of almost all otherwise suitable liquids. Referring to FIGURE 7 for instance, it is found that the dispersion effect of the toluene prism alone compensates for almost all of the color introduced by the primary refraction at the interface of substance 47 and plate 48.

The prism angle $\delta$ of the color compensation prism 49 must thus be held small to avoid over-compensation. Under these conditions it is found that the limiting angle of total reflection at prism face 53 is closely approached and often exceeded. This tends to reduce the intensity of the transmitted light beam or to prevent passage of light completely. The difficulty can be overcome by making prism angle $\delta$ as large as necessary to pass sufficient light, and then providing reverse color correction by a wedge 52 which may be located anywhere in the light path. This wedge must oppose the action of prism 49, and thus should be oriented as shown in FIGURE 7 in dotted outline.

Alternatively, and to simplify the instrument, the top plate 48 may be replaced by a weak prism orientated such as to oppose the color effect of prism 49, or the objective lens 51 may be a single lens or a substantially under corrected doublet sufficiently decentered as shown in FIGURE 7, so as to generate the desired color effect.

The decentration necessary to correct an angular color fringe $de$ occurring over a certain wave length band is $$\Delta = vfde$$

where $f$ = focal length
$v$ = dispersion over wave length band considered

In a typical case the residual color $de$ to be corrected may amount to 5′ or .0015 radians.

The necessary decentration for a 50 mm. objective of a $v$-value of 60, will then be 4.5 mm., an acceptable figure.

If glasses of lower $v$-value are used, a useful correction of residual errors can be obtained with decentrations as low as ⅟₁₀₀ $f$.

Rotation of the decentered objective lens in its mount will decrease the amount of color correction according to the cosine law. It can be used to precisely achromatize the refractometer and to compensate for the usual small manufacturing variations of index and $v$-value of the glass batches, an important practical advantage.

Completely satisfactory color correction can ordinarily be obtained at only one point of the refractometer range. This is due to the fact that the $v$-values of the solutions to be measured vary with concentration. In case of sugar solutions for instance, $v$ increases from 55 to 59 as the concentration goes from 5% to 50%. This effect causes the color at the boundry line of the refractometer shadow to change from red to blue as the reading increases, passing through a point of perfect correction. This "secondary spectrum" can be corrected by making use of the chromatic difference of magnificant (lateral color) of an uncorrected objective lens. The color generated by lens 82, FIGURE 10, changes from red to blue as the shadow moves across the image plane, because the dark area of the image plane faces the edge of the field at 0%, but faces the center of the field at the 50% reading. The effect becomes particularly large when the effective aperture stop 81 is located at a distance from the lens 82, on either side of it, depending on the sign of the desired correction. Excellent results have been obtained in practical designs when the effective stop was located in front of the lens at distances ranging from ½ to ⅙ of the focal length.

Having thus described the invention what I claim as new and desire to secure by letters patent is:

1. A refractometer operating with a source emitting bundles of light and having an entrance face to receive different substances within a range of refractive indices to be measured, said refractive indices varying with temperature changes, an objective having an image plane, said entrance face and said image plane being positioned in such a way that bundles of light from said source leave said face at various angles and are focused by said objective to an optical image in said image plane, comprised of a compensating member arranged in the path of said bundles of light to compensate for said variations of said refractive indices with temperature, said bundles of light striking said compensating member which is oriented at an angle of incidence and has a variation in its refractive index with respect to temperature which is sufficient for the range of refractive indices to be measured, said compensating member utilizing the variation in its refractive index with respect to temperature to cause the light which has been deviated by various angles depending on said angle of incidence and said temperature changes to compensate at two different points in said image plane for the temperature error resulting from the temperature coefficient of refraction of said different substances under test.

2. The invention according to claim 1 wherein said compensating member comprises a prism with a hollow cavity filled with a liquid.

3. The invention according to claim 1 wherein said compensating member comprises a non-vitreous prism.

4. The invention according to claim 1 wherein said compensating member comprises a prism with at least one curved surface for compensating at additional points in said image plane.

5. The invention according to claim 1 wherein said objective has a focal length and is a decentered color-correcting lens, the decentration being more than 1% of said focal length and producing a color fringe of at least one-half minute.

6. The invention according to claim 1 wherein said optical image in said image plane has a bright portion and a dark portion separated by a boundary line, the position of which is dependent on the index of refraction of the substance being measured, wherein said objective is a lens having a chromatic variation of magnification to reduce the change of a hue of color fringe at said boundary line as caused by a change in the position of said boundary line, and wherein an aperture stop is on one side of said objective and spaced apart therefrom.

7. A refractometer operating with a source emitting bundles of light and having an entrance face to receive different substances within a range of refractive indices to be measured, said refractive indices varying with temperature changes, an objective having an image plane, said entrance face and said image plane being positioned in such a way that bundles of light from said source leave said face at various angles and are focused by said objective to an optical image in said image plane, comprised of a compensating member arranged in the path of said bundles of light to compensate for said variations of said refractive indices with temperature, said bundles of light striking said compensating member which is oriented at an angle of incidence and has a variation in its refraction with respect to temperature which is sufficient for the range of refractive indices to be measured, said compensating member utilizing the variation in its refraction with respect to temperature to cause the light which has been deviated by various angles depending on said angle of incidence and said temperature changes to compensate at two different points in said image plane for the temperature error resulting from the temperature coefficient of refraction of said different substances under test.

8. The invention according to claim 7 wherein said compensating member comprises a prism with a hollow cavity filled with a liquid.

9. The invention according to claim 7 wherein said compensating member comprises a non-vitreous prism.

10. The invention according to claim 7 wherein said compensating member comprises a prism with at least one curved surface for compensating at additional points in said image plane.

11. The invention according to claim 7 wherein said objective has a focal length and is a decentered color-correcting lens, the decentration being more than 1% of said focal length and producing a color fringe of at least one-half minute.

12. The invention according to claim 7 wherein said optical image in said image plane has a bright portion and a dark portion separated by a boundary line, the position of which is dependent on the index of refraction of the substance being measured, wherein said objective is a lens having a chromatic variation of magnification to reduce the change of a hue of color fringe at said boundary line as caused by a change in the position of said boundary line, and wherein an aperture stop is on one side of said objective and spaced apart therefrom.

References Cited by the Examiner
UNITED STATES PATENTS

| | | | |
|---|---|---|---|
| 1,902,387 | 3/1933 | VonHofe et al. | |
| 2,383,347 | 8/1945 | Silge | 88—14 |
| 2,481,660 | 9/1949 | Harrison. | |
| 2,484,675 | 10/1949 | Biderman | 88—57 |
| 2,502,913 | 4/1950 | Arnulf | 88—14 |
| 2,780,140 | 2/1957 | Luboshez | 88—57 |
| 2,885,923 | 5/1959 | Simmons | 88—14 |
| 2,934,992 | 5/1960 | Goldberg | 88—14 |
| 2,972,926 | 2/1961 | Goldberg et al. | 88—14 |

FOREIGN PATENTS

| | | |
|---|---|---|
| 972,995 | 9/1950 | France. |
| 1,240,397 | 7/1960 | France. |

JEWELL H. PEDERSEN, *Primary Examiner.*

EMIL G. ANDERSON, *Examiner.*

T. L. HUDSON, *Assistant Examiner.*